(12) United States Patent
Roche

(10) Patent No.: US 6,356,998 B2
(45) Date of Patent: *Mar. 12, 2002

(54) METHOD FOR THE MANAGEMENT OF INTERRUPTS IN A MICROPROCESSOR

(75) Inventor: Franck Roche, Biver (FR)

(73) Assignee: STMicroelectronics S.A., Gentilly (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/251,552

(22) Filed: Feb. 17, 1999

(30) Foreign Application Priority Data

Feb. 20, 1998 (FR) .................................. 98 02302

(51) Int. Cl.⁷ .................................................. G06F 9/00
(52) U.S. Cl. .................... 712/244; 710/262; 710/264
(58) Field of Search .......................... 712/244; 710/262, 710/264

(56) References Cited

U.S. PATENT DOCUMENTS

| | | | | |
|---|---|---|---|---|
| 3,828,327 A | | 8/1974 | Berglund et al. ......... 340/172.5 |
| 4,250,546 A | * | 2/1981 | Boney ......................... 710/262 |
| 5,437,042 A | * | 7/1995 | Culley et al. ................. 710/28 |
| 5,455,934 A | * | 10/1995 | Holland et al. ................. 711/4 |
| 5,495,615 A | * | 2/1996 | Nizar et al. ................. 710/260 |
| 5,551,033 A | * | 8/1996 | Foster et al. ................ 713/100 |
| 5,606,671 A | * | 2/1997 | Wadsworth et al. ......... 710/106 |
| 5,671,424 A | * | 9/1997 | Wisor et al. ................. 710/269 |
| 5,685,009 A | | 11/1997 | Blomgren et al. ........... 395/800 |
| 5,875,342 A | * | 2/1999 | Temple ....................... 710/262 |
| 5,958,036 A | * | 9/1999 | Burns ......................... 710/262 |

FOREIGN PATENT DOCUMENTS

| | | | |
|---|---|---|---|
| FR | 2 118 715 | 7/1972 | ............. G06F/9/00 |
| FR | 2 658 628 | 8/1991 | ............ G05B/19/18 |

OTHER PUBLICATIONS

Steve McGeady, Microprocessors and Microsystems, "*Inside Intel'si 960CA Superscalar Processor*", vol. 14, No. 6, Jul./Aug. 1990, pp. 385–396.

* cited by examiner

*Primary Examiner*—John F. Niebling
*Assistant Examiner*—Stacy A Whitmore
(74) *Attorney, Agent, or Firm*—Lisa K. Jorgenson; Allen, Dyer, Doppelt, Milbrath & Gilchrist, P.A.

(57) ABSTRACT

A method for managing interrupts in a microprocessor includes interrupts having a two-fold order of priority, i.e., a software priority and a hardware priority, wherein the microprocessor operates in two modes. During a first mode, the execution of an interrupt routine cannot be interrupted by the arrival of a new interrupt, even if it is a priority interrupt, unless this new interrupt is non-maskable. During a second mode, the execution of an interrupt routine is interrupted by the arrival of a priority interrupt. At the time of the execution of an interrupt, its software priority level is loaded into the state register of the microprocessor.

16 Claims, 2 Drawing Sheets

METHOD FOR THE MANAGEMENT OF INTERRUPTS IN A MICROPROCESSOR

FIELD OF THE INVENTION

The present invention relates to the field of microprocessors, and, more particularly, to interrupts in a microprocessor.

BACKGROUND OF THE INVENTION

Interrupts are used for reporting an event to a microprocessor. When an interrupt is received by the microprocessor, it interrupts the execution of the program in progress, saves the value of the instruction counter in a stack, and then executes a processing routine corresponding to this interrupt. After this processing routine, the execution of the program is resumed starting from the value saved in the stack.

Conventionally, the microprocessor includes several interrupt inputs that enable the microprocessor to receive several interrupts at a time. There is an order of priority between these different interrupts. When two interrupts arrive simultaneously, the interrupt having the highest hierarchical priority is processed first. The order of priority of the interrupts is generally determined by hardware circuits in an interrupt controller of the microprocessor. Furthermore, some of these interrupts are maskable, i.e. the microprocessor is not effected by these interrupts.

Management of the interrupts in a microprocessor can be accomplished in two modes. In a first mode, commonly called a "concurrent mode", execution of an interrupt routine cannot be interrupted by the arrival of a new interrupt even if it has priority. The new interrupt is then placed in a pending state. Only a non-maskable interrupt is capable of interrupting execution of an interrupt routine in progress.

During this mode, the microprocessor is not effected by the arrival of any new interrupts, except for the non-maskable interrupts. The masking bit is contained in a state register of the microprocessor, and is set at a 1 as soon as the interrupt is received by the microprocessor. The masking bit remains at a 1 during the processing of the interrupt. The masking bit is often called an I bit. This setting at a 1 is done by hardware. When there is no interrupt, this bit is at a 0. Furthermore, if the microprocessor receives a non-maskable interrupt during the processing of an interrupt that is maskable, the non-maskable interrupt is processed immediately by the microprocessor without this bit being taken into account.

The contents of the instruction counter and of the state register are saved in the stack as in the case of a standard interrupt. This mode is the default mode of operation for the microprocessor, and is hereinafter called mode A. The state register of the microprocessor includes, in addition to the masking bit, flags on the state of the microprocessor. This register, in particular, includes flag C which is set at a 1 when the carry value exceeds the most significant bit of the operands during an addition. Flag Z is set at a 1 if the result of the operation is a 0, and flag N is set at a 1 when the result is negative.

In a second mode of operation, commonly called the "nested mode", the arrival of an interrupt with a higher priority than the ongoing one interrupts the processing of this ongoing interrupt. Processing is resumed only after the processing of the priority interrupt is completed. This mode makes it possible to overlap the interrupts, and is hereinafter called mode B. To implement this mode, it is generally planned after reception of an interrupt to set the masking bit at a 1 by the hardware, and then to reset it at a 1 by software.

Management of the interrupts during this mode operates as follows. During the execution of the main program, the masking bit is at 1 and the microprocessor is then in a state enabling it to process any possible interrupt as soon as it is received. When an interrupt IT1 is received by the microprocessor, the contents of the instruction counter and of the state register of the microprocessor are saved in the stack. The masking bit is set at a 1 by hardware. The instruction counter is loaded with the interrupt vector corresponding to the interrupt IT1. The routine corresponding to the interrupt IT1 is then executed. In order that the upcoming priority interrupts be processed immediately, the masking bit is set at a 1 by the software.

If a second interrupt IT2 with a higher priority appears at the interrupt inputs of the microprocessor during the processing of the interrupt IT1, the contents of the instruction counter and those of the state register are saved in the stack. The instruction counter is loaded with the interrupt vector corresponding to the interrupt IT2. The routine corresponding to the interrupt IT2 is executed. Once this routine is completed, the last value of the stack is restored. The execution of the interrupt routine IT1 is continued until its end. Then the stack is again restored and the execution of the main program is continued.

There also exist microprocessors in which the order of priority is double, i.e., in addition to the circuits used to define a fixed order of hardware priority, the interrupt controller includes a software modification of this order of priority. Hereinafter in the description, a hardware priority will be understood to mean a priority achieved by hardware circuits, and a software priority will be understood to mean a priority achieved by a program.

Operation of this type of microprocessor is as follows. If the microprocessor receives an interrupt, a comparison is made initially between its level of software priority and that of the interrupt or of the program in progress. If the level of software priority of the new interrupt is higher, the interrupt routine or the program in progress is interrupted. The masking bit of the microprocessor is set at a 1 so that the priority interrupt is processed immediately. If not, the new interrupt is placed in a pending state. Thus, in order that the microprocessor may operate in mode A, it is sufficient that all the interrupts should have the same level of software priority. If this is not the case, the microprocessor operates in mode B.

The mode of operation of this type of microprocessor is therefore dictated by the software priority. This type of microprocessor is especially appropriate when the operation of the microprocessor has to be customized for the requirements of an application. However these microprocessors, with or without software priority, require a software step for the zero-setting of the masking bit after it has been set at a 1 by the hardware to operate in mode B.

SUMMARY OF THE INVENTION

It is an object of the invention to reduce the number of operations to be performed for the microprocessor to operate in mode B, i.e., an overlapping mode. In particular, the software step that places the masking bit at a 1 for reducing the time needed for the management of the interrupts in mode B is eliminated.

Another object of the invention is to provide a method for the management of interrupts in a microprocessor. The interrupts have a two-fold order of priority, i.e., a software priority and a hardware priority. The microprocessor operates in two modes. A first mode executes an interrupt routine which cannot be interrupted by the arrival of a new interrupt, even if it is a priority interrupt, unless this interrupt is non-maskable. In a second mode, the execution of an interrupt routine is interrupted by the arrival of a priority interrupt.

The mode of operation of the microprocessor is conditioned by the software priority level of the interrupts. At the time of the execution of an interrupt, its software priority level is loaded into the state register of the microprocessor. This loading operation replaces the two-fold operation for the one-setting of the masking bit by hardware and its zero-setting by software. This operation is performed automatically by hardware circuits.

Execution of an interrupt routine in progress is interrupted by the arrival of a new interrupt when the software priority level of this new interrupt is greater than that of the interrupt in progress. Thus, the software priority modifies the order of hardware priorities and informs the microprocessor whether or not it should interrupt the execution of the interrupt in progress.

To obtain the operation of the microprocessor in mode A, it is sufficient to provide one and the same software priority level for each interrupt. The software priority level assigned to each interrupt is encoded on n bits and these bits, which are to be loaded into the state register of the microprocessor, are preferably contained in n distinct registers.

BRIEF DESCRIPTION OF THE DRAWINGS

Other objects, features and advantages of the present invention will become apparent from the detailed description of the invention which follows, when considered in light of the accompanying drawings, in which.

DETAILED DESCRIPTION OF THE PREFERRED EMBODIMENTS

According to the invention, at the time of the execution of an interrupt, a software priority level is loaded into the state register of the microprocessor. Depending on their number, the software priority levels are encoded on one or more bits. Hereinafter in the description, the method, given by way of an example and illustrated in FIGS. 2 and 3, comprises four software priority levels. Each level is encoded on two bits, I1 and I0. The software priority levels are defined in the following table:

| Software priority | I1 | I0 |
|---|---|---|
| Level 0 (main prog.) | 1 | 0 |
| Level 1 | 0 | 1 |
| Level 2 | 0 | 0 |
| Level 3 | 1 | 1 |

At the time of the execution of an interrupt, the corresponding bits I0 and I1 are loaded by hardware into the state register of the microprocessor. The bits to be loaded into the state register are provided by two registers R0 and R1. The register R0 provides the bit I0 and the register R1 provides the bit I1. In the example that follows, the registers R0 and R1 are 16-bit registers, with each bit relating to a particular interrupt.

| Interrupt | IT15 | IT14 | IT13 | IT0 |
|---|---|---|---|---|
| Register R0 | 1 | 1 | I1_13 | I1_0 |
| Register R1 | 1 | 1 | I0_13 | I0_0 |

The bit I0 is preferably loaded into the location of the state register reserved for the masking bit, i.e., bit I. The bit I1 is loaded into an unused location of the register. This location generally stores a logic level 1. Thus, the lowest software priority level is 10 and the highest software priority level is 11 to preserve compatibility with the operation of existing microprocessors. During execution of the main program, the bits I1 and I0 stored in a state register are respectively equal to 1 and 0, i.e., the lowest software priority level. Thus, when the interrupt signal appears at the interrupt inputs of the microprocessor, this signal interrupts execution of the main program and processes the interrupt.

Figure 1:
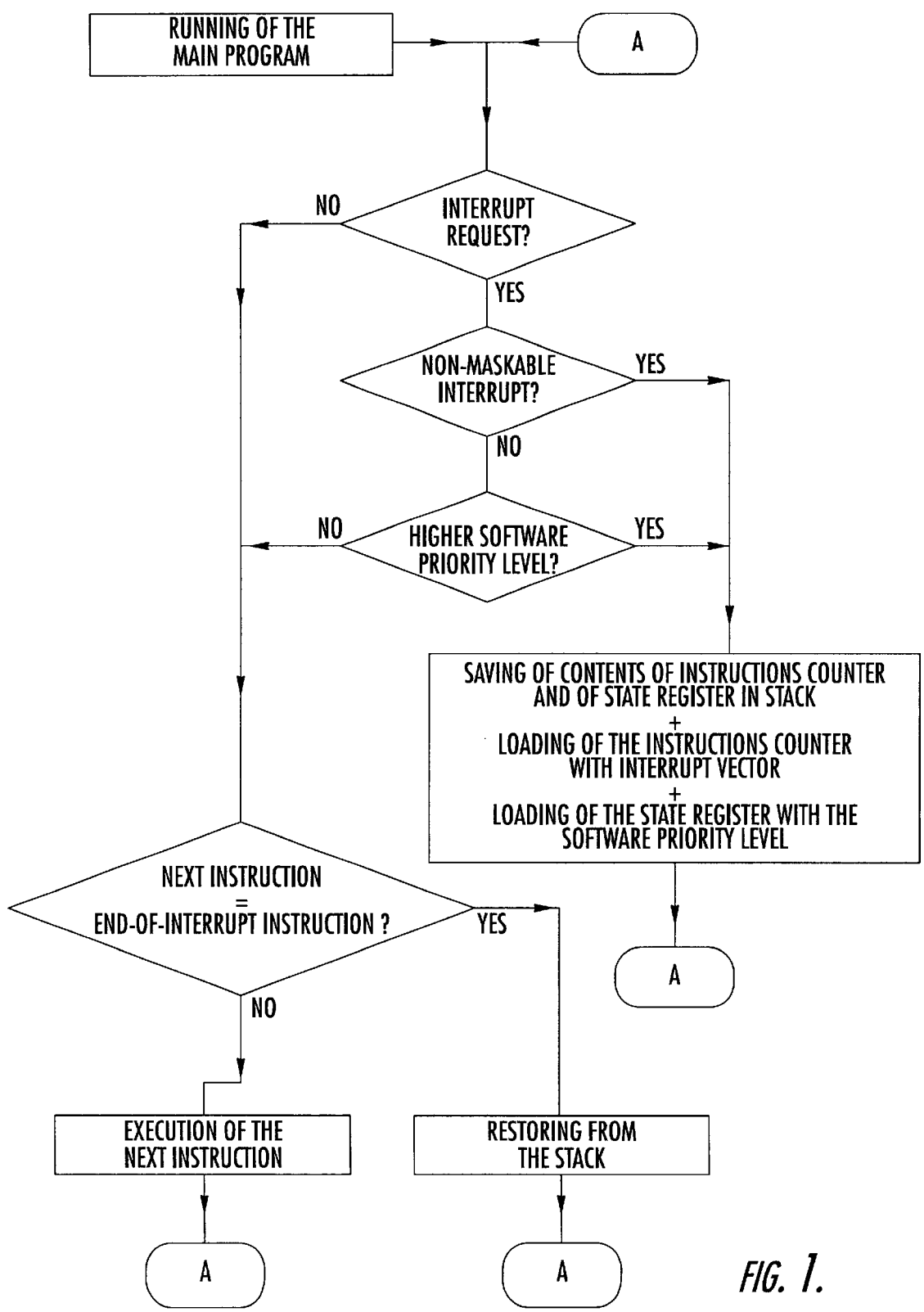
FIG. 1 is a flow chart for the management of interrupts, according to the present invention.

The flow chart for the processing of the interrupts according to the present invention is shown in FIG. 1. The management of the interrupts is performed as follows. Whenever the software priority level of the new interrupt is greater than that of the interrupt in progress, or whenever the new interrupt is a non-maskable interrupt, the interrupt routine in progress is interrupted. The contents of the instructions counter and of the state register of the microprocessor are saved in the stack. The instructions counter and the state register are then loaded respectively with the interrupt vector and the software priority level of the new interrupt. The routine of the new interrupt is then executed. As long as the microprocessor does not receive any new interrupt requests, it performs the instructions of the interrupt routine. This permanent looping to detect the arrival of new interrupts is symbolized in FIG. 1 by the letter A.

If the microprocessor receives interrupts of a same software priority level or of a lower level, it keeps them pending. As soon as the routine of the interrupt in progress has ended, the microprocessor restores the contents of the stack in the instructions counter and the state register. Detection of the end-of-interrupt instruction indicates that the interrupt in progress has ended. If a pending interrupt has a higher software priority level than that of the restored interrupt, then this restored interrupt is again saved in the stack (looping by A), and the pending interrupt is executed. If several interrupts having the same software priority are pending or arrive simultaneously at the inputs of the microprocessor, then the interrupt having the highest hardware priority level will be processed first.

According to the invention, the software priority level of the interrupts are saved in the stack of the interrupts controller. The interrupts are then identifiable by groups of priority levels at the level of the stack. Handling operations to reverse the elements of the stack are then made possible. In order that the microprocessor may operate according to mode A, it is sufficient to make one and the same level of software priority for all the interrupts.

Figure 2:
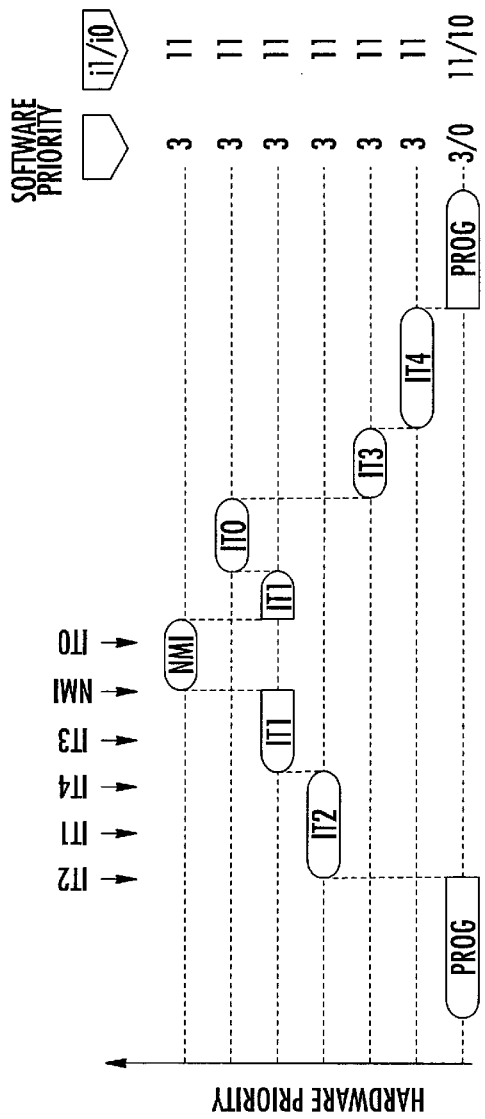
FIG. 2 is a diagram of the sequencing according to mode A for a succession of interrupts given by way of an example, according to the present invention.

FIG. 2 illustrates this mode of operation of the microprocessor. The software priority level chosen for this mode is 11. As the value of the bit I0 is 1, the loading of this bit into the state register is then equivalent to a one-setting of the masking bit of the register. The value of the bit I1 is taken to be equal to 1 so as not to modify the value of the bit corresponding to the state register. Operation of the microprocessor is activated by an interrupt, commonly called RESET, whose execution is completed when the microprocessor is turned off. This interrupt has the highest software priority level. This is why it is necessary to load the level 10 into the state register so that the execution of the RESET interrupt can be suspended by the other interrupts. FIG. 2 brings into operation six interrupts, mentioned hereinafter in the rising order of their level of hardware priority: IT4, IT3, IT2, IT1, IT0 and NMI. The interrupt NMI designates a non-maskable interrupt. The software priority level assigned to these interrupts is 11.

During the execution of the main program, the software priority level goes from 11 to 10 so that the interrupts IT4, IT3, IT2, IT1, IT0 and NMI are processed. The interrupts reach the interrupt inputs of the microprocessor in the following order: IT2, IT1, IT4, IT3, NMI and IT0. These interrupts are processed in the following order. The interrupt IT2 suspends the execution of the main program. The contents of the instructions counter and of the state register are saved in the stack, and IT2 is executed. During its execution, the interrupts IT1 and IT4 are placed in a pending state. At the end of the execution of the interrupt routine IT2, the stack is restored. Since the software priority level of the main program is smaller than that of IT1, the contents of the instructions counter and of the state register are put back in the stack. Then, the interrupt routine IT1 is executed because IT1 has a higher software priority level than the interrupt IT4.

During the processing of IT1, the interrupt IT3 is placed in a pending state. Then the non-maskable interrupt NMI comes into play and the processing of IT1 is suspended. The contents of the instructions counter and of the state register are saved in the stack, and the routine of NMI is executed. IT0 is placed in a pending state. After the execution of the routine of NMI, the stack is restored and the processing of IT1 is continued until it reaches its end. Then, the routines of the three pending interrupts IT0, IT3 and IT4 are executed in descending order of their software priority level. Finally, the stack is restored for a last time and the execution of the main program can be continued.

Figure 3:
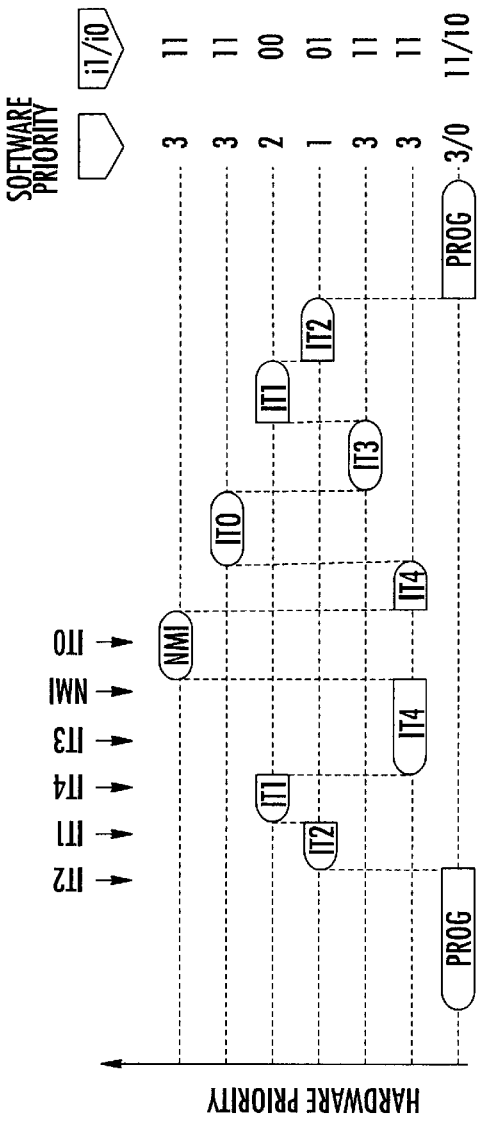
FIG. 3 is a diagram of the sequencing according to mode B for the succession of interrupts of FIG. 2.

FIG. 3 illustrates operation of the microprocessor according to the mode B through the same sequence of interrupts as in the preceding figure. In this mode, the interrupts are distributed on three software priority levels. The fourth level corresponding to the lowest level is reserved for the main program. More specifically, level 3 is assigned to the interrupts IT0, IT3, IT4 and NMI. Level 2 is assigned to the interrupt IT1, level 1 is assigned to the interrupt IT2, and level 0 is assigned to the main program.

The interrupts are processed in the following order. The interrupt IT2 (level 1) suspends the execution of the main program (level 0). The contents of the instructions counter and of the state register are saved in the stack, and the routine of IT2 is executed. Its execution is interrupted by the arrival of IT1 (level 2). The contents of the instructions counter and of the state register are saved in the stack, and the routine of IT1 is executed. Its execution is interrupted by the arrival of IT4 (level 3). The contents of the instructions counter and of the state register are saved in the stack, and the routine of IT4 is executed. IT3 is placed in a pending state. The processing of IT4 is interrupted by the arrival of NMI, which is non-maskable. The contents of the instructions counter and of the state register are saved in the stack, and the routine of NMI is executed. IT0 is put into a pending state.

At the end of the execution of the routine of NMI, the stack is restored and the processing of IT4 is continued up to its end. The interrupt having the highest software priority level is then processed. This level is IT0, and then IT3. Finally, the interrupts of the stack, namely IT1 and IT2, are processed. The stack is restored for a last time and the execution of the main program can continue.

That which is claimed is:

1. A method for managing interrupts in a microprocessor, each interrupt having a software priority and a hardware priority, the method comprising:

operating the microprocessor in a first mode during which execution of an interrupt routine cannot be interrupted by arrival of a new interrupt, unless the new interrupt is non-maskable;

operating the microprocessor in a second mode during which execution of the interrupt routine is interrupted by arrival of a new priority interrupt;

the first and second modes of operation of the microprocessor being responsive to the software priority level of the new interrupt; and loading the software priority level of the new interrupt into a state register of the microprocessor at the time of execution of the new interrupt so as to avoid a two-fold operation for setting a masking bit to a first logic state by hardware and setting the masking bit to a second logic state by software.

2. A method for managing interrupts according to claim 1, wherein execution of the interrupt routine in the first mode cannot be interrupted even if the new interrupt is a new priority interrupt.

3. A method for managing interrupts according to claim 1, further comprising interrupting execution of an interrupt routine in progress by arrival of the new interrupt if the software priority level of the new interrupt is greater than the software priority level of the interrupt routine in progress.

4. A method for managing interrupts according to claim 1, wherein operating the microprocessor in the first mode is based upon a same software priority level being assigned to each interrupt.

5. A method for managing interrupts according to claim 4, further comprising storing in n distinct registers of the state register the software priority level assigned to each interrupt encoded on n bits.

6. A method for managing interrupts according to claim 5, further comprising encoding the software priority level on two bits, and wherein a highest software priority level is 11 and a lowest software priority level is 10.

7. A method for managing interrupts in a microprocessor, each interrupt having a software priority and a hardware priority, the method comprising:

operating the microprocessor in a first mode during which execution of an interrupt routine cannot be interrupted by arrival of a new interrupt, even if the new interrupt is a new priority interrupt, unless the new interrupt is non-maskable;

operating the microprocessor in a second mode during which execution of the interrupt routine is interrupted by arrival of the new priority interrupt;

the first and second modes of operation of the microprocessor being responsive to the software priority level of the new interrupt;

loading the software priority level of the new interrupt into a state register of the microprocessor at the time of execution of the new interrupt so as to avoid a two-fold operation for setting a masking bit to a first logic state by hardware and setting the masking bit to a second logic state by software; and interrupting execution of an interrupt routine in progress by arrival of the new interrupt if the software priority level of the new interrupt is greater than the software priority level of the interrupt routine in progress.

8. A method for managing interrupts according to claim 7, wherein operating the microprocessor in the first mode is based upon a same software priority level being assigned to each interrupt.

9. A method for managing interrupts according to claim 8, further comprising storing in n distinct registers of the state register the software priority level assigned to each interrupt encoded on n bits.

10. A method for managing interrupts according to claim 9, further comprising encoding the software priority level on two bits, and wherein a highest software priority level is 11 and a lowest software priority level is 10.

11. A microprocessor comprising:

a state register for receiving new interrupts;

a first routine for operating in a first mode during which execution of an interrupt routine cannot be interrupted by arrival of a new interrupt, unless the new interrupt is non-maskable;

a second routine for operating in a second mode during which execution of the interrupt routine is interrupted by arrival of a new priority interrupt; and said first and second routines being responsive to a software priority level of the new interrupts, the software priority level of the new interrupts being loaded into said state register at the time of execution of the new interrupts so as to avoid a two-fold operation for setting a masking bit to a first logic state by hardware and setting the masking bit to a second logic state by software.

12. A microprocessor according to claim 11, wherein execution of the interrupt routine for operating in the first mode cannot be interrupted even if the new interrupt is a priority interrupt.

13. A microprocessor according to claim 11, wherein execution of the interrupt routine is interrupted by arrival of the new interrupt if the software priority level of the new interrupt is higher than a software priority level of the interrupt routine.

14. A microprocessor according to claim 11, wherein operating in the first mode is based upon a same software priority level being assigned to each interrupt.

15. A microprocessor according to claim 14, wherein said state register comprises n distinct registers; and wherein the software priority level assigned to each new interrupt is encoded on n bits, and the n bits are stored in said n registers.

16. A microprocessor according to claim 15, wherein the n bits comprises two bits, and wherein a highest software priority level is 11 and a lowest software priority level is 10.

* * * * *